Feb. 12, 1957 G. G. BOWER 2,781,417

TELEPHONE TRANSMISSION SYSTEM

Filed Aug. 7, 1953 3 Sheets-Sheet 1

INVENTOR.
GEORGE G. BOWER
BY
Harry M. Saragovitz
ATTORNEY

Feb. 12, 1957 G. G. BOWER 2,781,417

TELEPHONE TRANSMISSION SYSTEM

Filed Aug. 7, 1953 3 Sheets-Sheet 2

INVENTOR.
GEORGE G. BOWER

BY Harry M. Saragovitz
ATTORNEY

Feb. 12, 1957 G. G. BOWER 2,781,417

TELEPHONE TRANSMISSION SYSTEM

Filed Aug. 7, 1953 3 Sheets-Sheet 3

INVENTOR,
GEORGE G. BOWER

BY *Harry M. Saragovitz*

ATTORNEY

United States Patent Office 2,781,417
Patented Feb. 12, 1957

2,781,417

TELEPHONE TRANSMISSION SYSTEM

George G. Bower, Riverside, Calif., assignor to the United States of America as represented by the Secretary of the Army Application August 7, 1953, Serial No. 373,070
4 Claims. (Cl. 179—15.5)
(Granted under Title 35, U. S. Code (1952), sec. 266)

The invention described herein may be manufactured and used by or for the Government for governmental purposes, without the payment to me of any royalty thereon.

This invention relates to a telephone transmission system for long distance circuits and more particularly to means for the improvement of transmission on circuits commonly spoken of as two wire and four wire circuits.

The object of this invention is to provide a telephone transmission system in which a pilot frequency for regulation purposes is transmitted with a carrier channel. A further object is to provide an automatic equalizer to compensate for variations in line losses due to weather changes. A further object is to provide a regulator circuit to hold the level of a pilot frequency within certain limits in the regulated repeater. A further object is to provide a regulator circuit in which equilibrium is established within a short time period after a change in line loss has taken place. A further object is to provide a variable equalizer which post equalizes the incoming carrier channel and pre-equalizes the outgoing voice channel.

Figure 1:
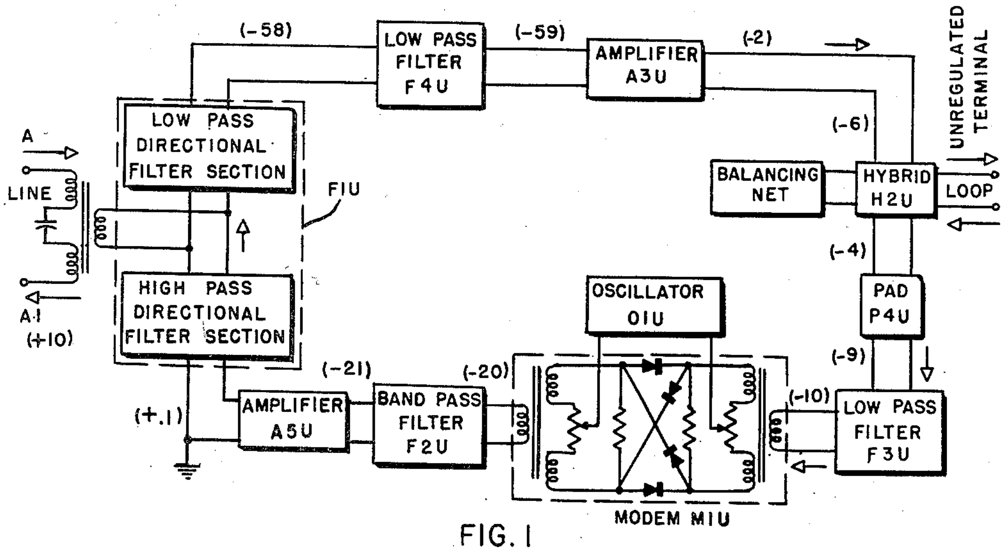
Figure 3:
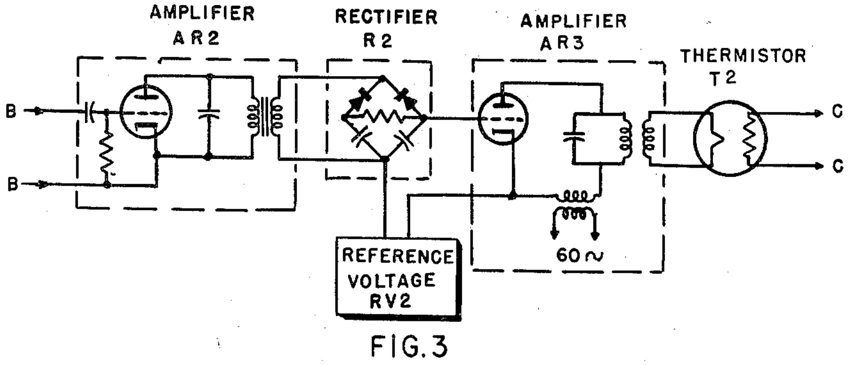
Figure 4:
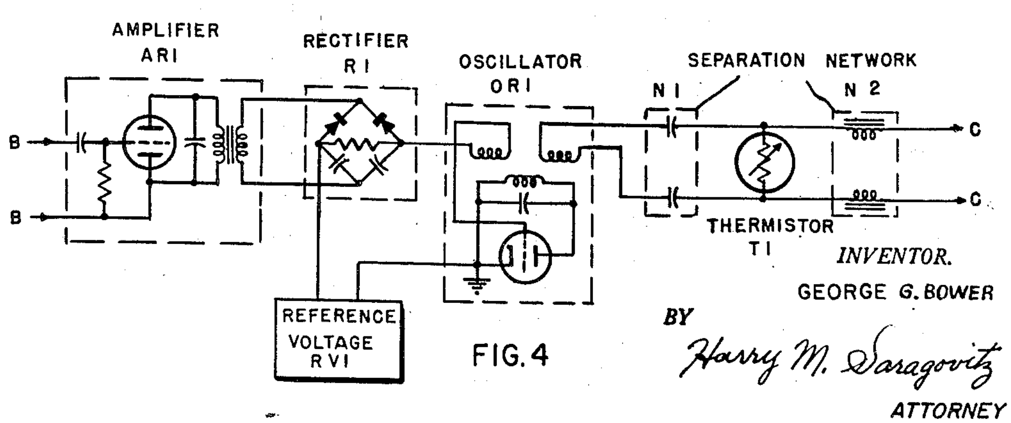
Figure 2:
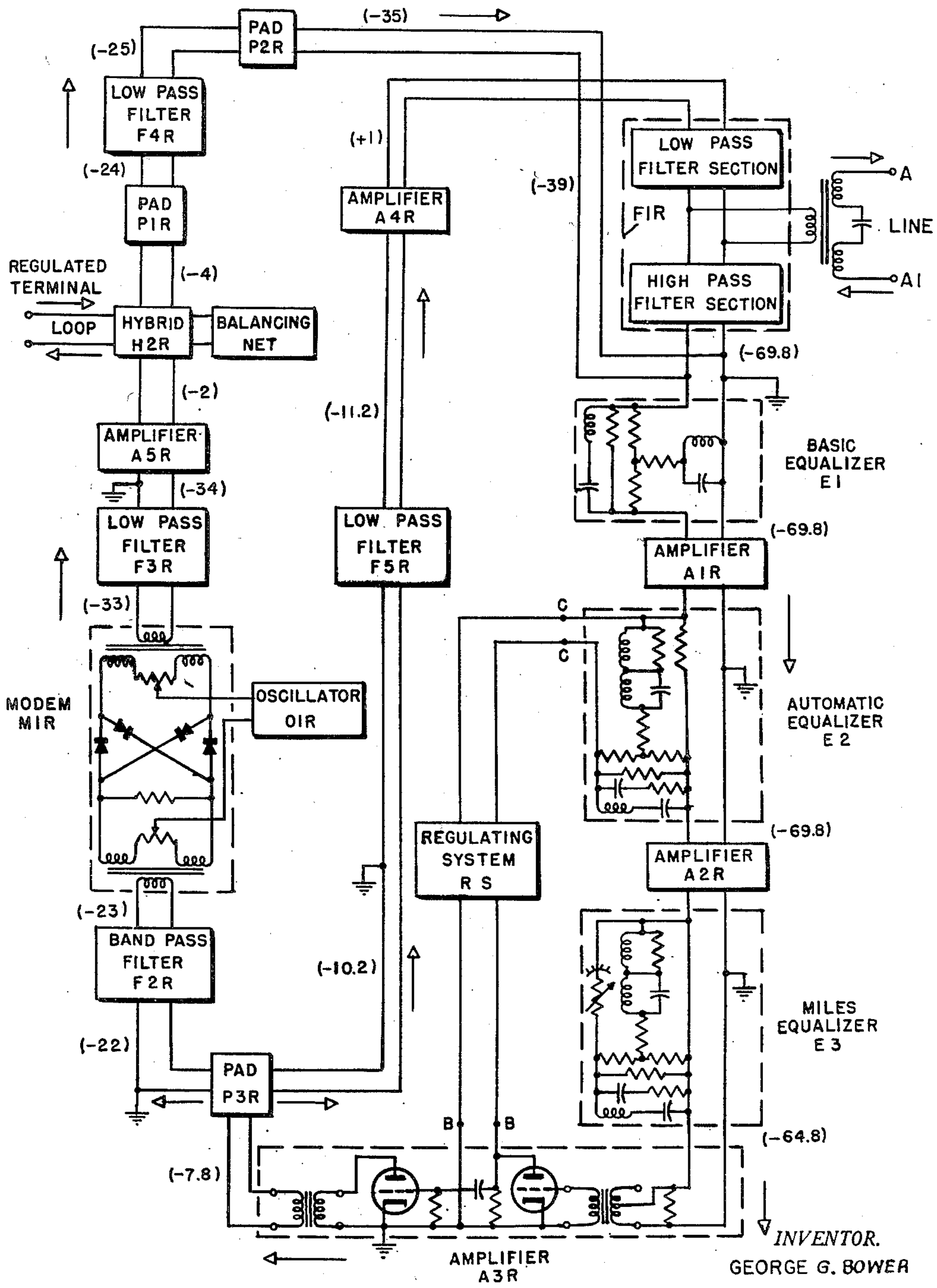
Figures 5, 6:
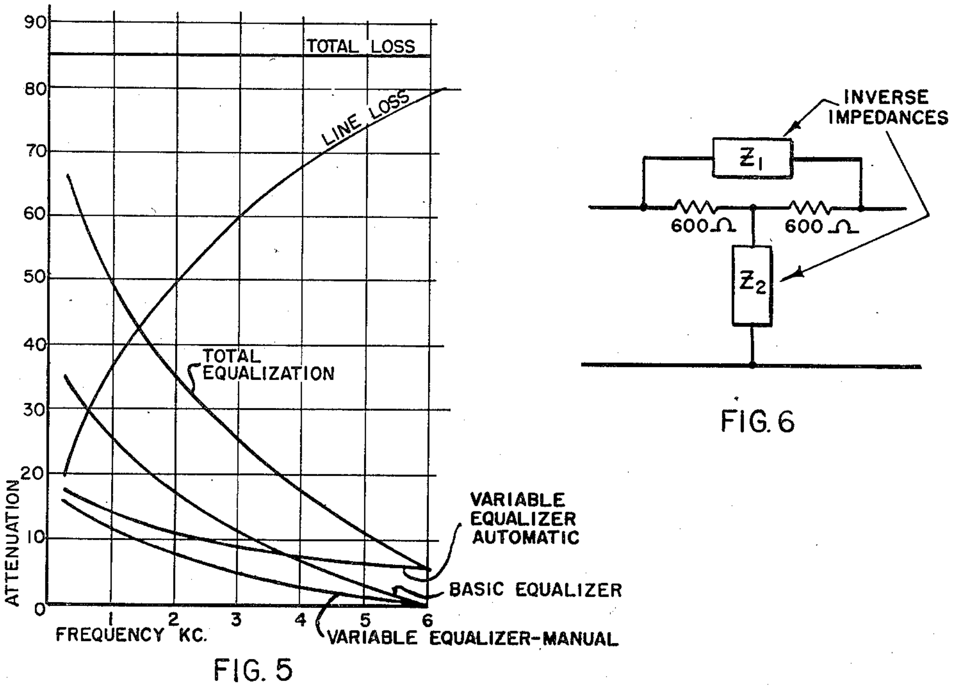
Figure 7:
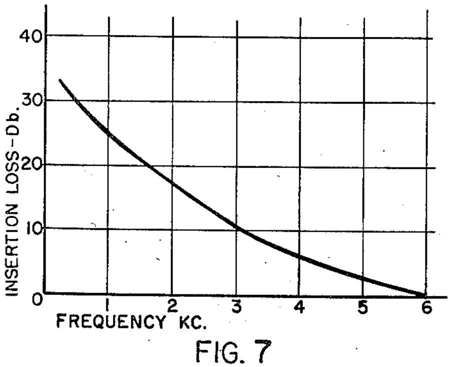
Figure 8:
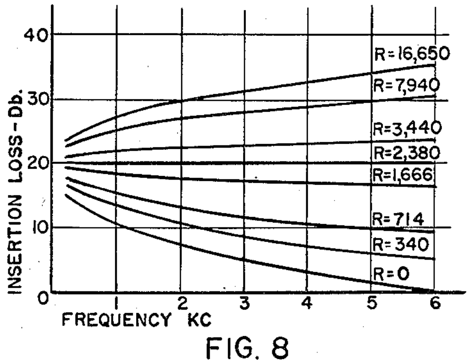
Figure 9:
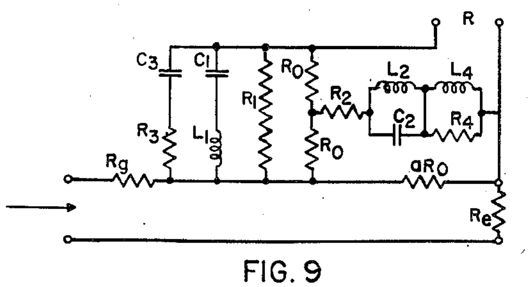

The invention will be better understood by reference to the following specifications and the accompanying drawings in which Figure 1 is a block diagram showing the unregulated repeater. Figure 2 is a block diagram showing a regulated repeater, while Figures 3 and 4 show regulating systems used in the regulated repeater of Figure 2. Figure 5 shows the equalization and regulation curves of the equalizers used in the regulated repeater. Figure 6 shows the basic equalizer circuit. Figure 7 shows the equalization curve of the equalizer shown in Figure 6. Figure 8 shows the characteristic curves of the variable equalizer while Figure 9 shows the variable equalizer circuit.

The invention is applicable to telephone systems having two repeaters, one unregulated as shown in Figure 1, and the other regulated, as shown in Figure 2, inter-connected by a line connected at terminals A—A1, which is subject to variations in line loss with weather changes. The repeaters are used in carrier frequency transmission systems where, for example, a voice channel of 200 C. P. S. to 2600 C. P. S. is used for transmission in one direction and a carrier channel of 3300 C. P. S. to 5700 C. P. S. is used for transmission in the other direction A pilot frequency of 5900 C. P. S. is transmitted with the carrier channel to compensate the line in accordance with the level of the received pilot frequency.

Referring to Figure 1, the voice frequency entering Hybrid H2U is translated to a carrier channel by Modulator M1U which also provides the pilot frequency. These signals are applied to the terminals A—A1 and through the interconnecting line to the like designated terminals of the regulated repeater of Figure 2. The carrier and pilot frequencies are in turn applied to the Automatic Equalizer E2 which is adjusted in accordance with the level of the attenuated pilot frequency. The carrier frequency is demodulated in Demodulator M1R and applied to Hybrid H2R. The voice frequency entering from H2R travelling in the opposite direction also enters the Automatic Equalizer E2 through pad P2R. After being equalized to the same degree as the carrier frequency, the voice channel is applied to the line terminals A and A1 through the Low Pass Filter F5R. The voice frequency entering the terminals A and A1 of the unregulated repeater of Figure 1 travels through the Low Pass Filter F4U to Hybrid H2U. This provides equalization for the carrier frequency applied to the regulated repeater and for the voice frequency transmitted from the regulated repeater.

The voice signal entering the Hybrid Transformer H2U of Figure 1 on the loop side is reduced in level by Pad P4U and restricted in frequency range to the top frequency of 2,600 C. P. S. by Low Pass Filter F3U. Pad P4U isolates Low Pass Filter F3U from the Hybrid Transformer H2U and reduces the level of the voice signal entering Modem M1U. This band is then translated up to the carrier channel of 3,300 C. P. S. to 5,700 C. P. S. in Modulator Modem M1U which is unbalanced to provide the pilot signal. This channel and the pilot frequency of 5,900 C. P. S., are then transmitted through Band Pass Filter F2U, which selects the lower side band after modulation. The particular frequency relationships are merely stated as examples as it is obvious that a wide range of frequencies could be used. The upper cut-off frequency of the Filter F2U is chosen sufficiently high to allow the pilot frequency of 5,900 C. P. S. to pass freely. The signal is then amplified in Amplifier A5U and the carrier channel and pilot frequency enter the line through the high pass section of Directional Filter F1U where the signal is applied to line terminals A—A1. Directional Filter F1U consists of a low pass and a high pass filter designed for parallel operation into the line. The function of the filter is to separate the frequency bands used for each direction of transmission. The incoming signal passing through the low pass section of Directional Filter F1U is applied to F4U. Low Pass Filter F4U limits the voice frequency range to a top frequency of 2,500 C. P. S. The output of F4U is amplified and applied to Hybrid H2U to complete the loop.

Referring to Figure 2, the carrier and pilot signals, after being attenuated in the line enter the regulated repeater terminals A—A1 through the high pass section of Directional Filter F1R. The carrier and pilot signals then enter a path which is in common with the voice signal entering the regulated repeater terminal on the loop side from Hybrid H2R. The path includes equalizers and amplifiers whose function is to post equalize the incoming carrier channel and pre-equalize the outgoing voice channel. Since the voice channel entering from the loop side of the regulated terminal is also applied to the automatic equalizer, which is adjusted in accordance with the level of the received pilot frequency, the outgoing voice channel is also equalized. The carrier signal passing through the high pass section of Directional Filter F1R enters basic equalizer E1. The function of this basic equalizer is to add sufficient loss to the sum of the loss of the interconnecting line plus the minimum loss of the Automatic Equalizer E2 plus the minimum loss of the Miles Equalizer E3, to get a flat overall loss in the frequency range of 200 C. P. S. to 6,000 C. P. S. The signal after leaving the basic Equalizer E1 is amplified in Amplifier A1R and enters the Automatic Equalizer E2. The Automatic Equalizer E2, having a variable element controlled by regulating system RS, compensates for variations in line loss. The variable element in the equalizer is a thermistor whose resistance is controlled by the level of the received pilot frequency, which is to be explained later. The output of the Equalizer E2 is amplified in Amplifier A2R and applied to Miles Equalizer E3 which is manually variable to compensate for the length of line in use between the two stations. The variable element in this equalizer is a variable resistor controlled by a knob calibrated in miles. Amplifier A3R is intended to supply the major part of the gain in the path that is common to both incoming carrier channel and the outgoing voice channel of the regulated terminal. An interstage tap is provided in this amplifier for feeding the pilot signal to the regulating system RS. Such a tap is necessary at this point to prevent local carrier oscillator signal in the regulated terminal from interfering with the pilot received from the other terminal.

The function of the regulating system RS is to hold the level of the pilot frequency within certain limits in the regulated terminal. The design of the Automatic Equalizer E2 is such that if this is done the response of the variable equalizer is set to compensate for the response of the line for any weather condition. Thus, the regulating system RS must translate small changes in the level of the pilot signal appearing in Amplifier A3R into large changes in the resistance in Automatic Equalizer E2. Equilibrium should be established by the regulator circuit within at least two minutes after a maximum change in line loss has taken place. Figure 4 shows such a regulating system using directly heated thermistors. A regulating system using a thermistor of this type is comprised of Amplifier AR1, a Rectifier R1, a Reference Voltage RV1, an Oscillator OR1, separation Networks N1 and N2 and Thermistor T1. In this system the thermistor is heated by high frequency currents in Oscillator OR1 of which the thermistor is a part. The separation networks N2 prevent the heating currents from the oscillator from interfering with voice currents in the variable equalizer and vice versa. The oscillator itself operates Class A, the equilibrium being established by the grid bias voltage which is a function of the pilot level, and the thermistor. Thus the operation is as follows: Should the level of pilot signal change due to a change in line loss, this change appears in Amplifier A3R and is applied to terminals B—B1 and is amplified by Amplifier AR1, after which it is rectified and compared with Reference Voltage RV1. The difference between these two voltages is then applied to Oscillator OR1 as grid bias which controls the level of oscillation and thereby the resistance of Thermistor T1. The thermistor is connected at points CC to Automatic Equalizer E2.

The regulating system shown in Figure 3 is similar in many respects to that of Figure 4. However, instead of a directly heated thermistor as shown in Figure 3, one heated indirectly by a small winding is used. A measure of the pilot level is taken in Amplifier A3 and amplified in Amplifier AR2. It is then rectified and compared with Reference Voltage RV2. The net voltage then biases Amplifier AR3 which admits more or less current to the Thermistor T2 heater winding. Separation networks are not necessary in this case.

Referring to Figure 2, the voice channel entering the loop side of the regulated terminal leaves the Hybrid Transformer H2R and the level is reduced by Pad P1R. It then goes through Low Pass Filter F4R where frequency above 2,600 C. P. S. is removed. The channel level is further reduced by Pad P2R which isolates Low Pass Filter F4R from the high pass section of Directional Filter F1R. The channel then enters the common path of equalizers and amplifiers. After passing through the common path the signal enters the Three Way Pad P3R where the voice channel is selected by Low Pass Filter F5R, and the carrier is selected in Band Pass Filter F2R before demodulation in balanced demodulator Modem M1R. The demodulated signal now enters Low Pass Filter F3R which selects the lower side band. The filtered output is applied to Amplifier A5R and Hybrid H2R. Low Pass Filter F5R introduces loss in the carrier frequency range to provide an adequate singing range in the loop that includes the Directional Filter F1R. After amplification in Amplifier A4R the voice signal goes through the low pass section of Directional Filter F1R.

At this point the voice channel should be fully pre-equalized for the length and condition of the line over which it has to travel. After traversing the line the voice channel enters the unregulated terminal through the low pass section of Directional Filter F1U of Figure 1; it then passes through Low Pass Filter F4U after which it is amplified and passes on to the loop side through Hybrid Transformer H2U.

Various modifications of the system described above and illustrated in the drawings which are within the spirit and scope of the invention will occur to persons skilled in the art. In practice desirable results have been obtained with two repeaters connected by a line which is to be regulated and equalized so that the net loss from the loop side of one repeater to the loop side of the other repeater is 6 db±2 db on a two wire basis for a line having a maximum length of 15 miles. These limits apply in a frequency band of 200 C. P. S. to 2,600 C. P. S. Obviously, further extensions in length may be made by connecting the loop sides of the repeaters in tandem. The characteristics of the various networks which have produced satisfactory operation are given below. It is to be understood that the system is not limited to the particular cited examples.

Amplifiers A1R and A1U have a gain of 5 db. The input impedance is 600 ohms and the output impedance is 120 ohms unbalanced. A sufficient amount of negative feed back is included to stabilize the amplifiers and provide for a uniform response over the frequency range from 200 C. P. S. to 600 C. P. S. Amplifier A2R has an input and an output impedance of 120 ohms the gain of the amplifier being 5 db. Amplifier A3R has an input impedance of 120 ohms, and A3U has an input impedance of 600 ohms. The output impedance is 600 ohms, in either amplifier, and the gain is 57 db. Amplifier A4R has a gain of 12.2 db and raises the voice channel in the regulated terminal for transmission over the line after the voice channel is separated from the carrier channel. The input and output impedance is 600 ohms. Amplifier A5R raises the level of the demodulated carrier channel while Amplifier A5U raises the level of the modulated voice channel, both having an input and output impedance of 600 ohms and a gain of 32 db. The Basic Equalizer E1 consists of a Bridge T constant 600 ohms resistance equalizer as shown in Figure 5. The characteristic curve of the equalizer is shown in Figure 6. Automatic equalizer E2 is shown in Figure 7. The particular values of the components which may be used in this equalizer are given below:

| | | |
|---|---|---|
| R1 | ohms | 2694 |
| R2 | do | 2102 |
| R3 | do | 985 |
| R4 | do | 5748 |
| R*o* | do | 2380 |
| AR*o* | do | 23,800 |
| R*g* | do | 120 |
| R3 | do | 120 |
| C1 | mfd | .11035 |
| C2 | mfd | .001125 |
| C3 | mfd | .0946 |
| L1 | hys | 6.375 |
| L2 | hys | .625 |
| L4 | hys | .5358 |

The variable element R in the equalizer is a thermistor whose resistance is controlled by the level of the received pilot frequency. Figure 8 shows the characteristic curves for various values of R. The Modems consist of a lattice arrangement of crystal diodes; however, other types of modulator-demodulator networks could be used. The relative levels of the various stages are indicated on the figures in parentheses. These levels have been set on the basis of perfect equalization and regulation of 15 miles of wet interconnecting wire. Figure 5 shows the equalization and regulation of equalizers E1, E2, E3, and the total equalization. In the carrier portion of the system, a frequency of 5900 C. P. S. was used for a basis of calculation. In the voice frequency portion of the system, a frequency of 2600 C. P. S. was chosen.

While the regulated and unregulated repeaters are shown in separate figures, the repeaters may be mounted within the same case along with the necessary power supply. A switch is provided so that the operator may have a choice as to whether the regulated or unregulated repeater is used. Common use can be made of the components in each repeater that serve in either function. A 20 C. P. S. and D. C. by-pass through the regulators can be provided if desired.

What is claimed is:

1. In a telephone transmission system having an unregulated and a regulated repeater interconnected by a transmission line, said regulated repeater comprising a directional filter having high and low pass filter sections; means for coupling the directional filter to said transmission line; a first equalizer connected to the high pass section for initially equalizing the incoming signal; a regulating means; a second variable equalizer controlled by the regulating means and connected to the first equalizer; a third manually adjusted equalizer to compensate for the line distance and coupled to the second equalizer; a dividing network; means for applying the signal to said regulating means and to said dividing network; a demodulator channel including in series a band pass filter for selecting the carrier frequency, a demodulator means, a first low pass filter and a hybrid transformer; a voice channel having a second low pass filter connected to said low pass section of said directional filter; said dividing network applying the signal to the demodulator channel and the voice channel; a third low pass filter connected from said hybrid transformer to the input of the first equalizer.

2. In a two-way repeatered transmission system a repeater for equalizing transmission in either direction to compensate for transmission line attenuation comprising a high pass filter coupled to the transmission line, a variable equalizer coupled to said filter and controlled by the incoming signal, a dividing network, means for applying the output from said variable equalizer to said dividing network, a first branch circuit including a demodulator coupled to said dividing network, a hybrid junction, means for coupling the output of the dividing network to said hybrid junction, a low pass filter coupled to said high pass filter, a second branch circuit coupled to said dividing network and said low pass filter whereby signals in either direction pass through said variable equalizer.

3. An automatic equalization control system for two way telephone transmission comprising a transmission line terminal network having first and second branch circuits, a voice terminal network having first and second branch circuits, a dividing network, said first branch circuit including an automatic equalizer for compensating for variable line attenuation and coupled to said dividing network, said second branch circuit including a low pass filter coupled to said dividing network, the first branch circuit of said voice terminal network connected to said automatic equalizer and the second branch circuit of said voice terminal network including a demodulator and coupled to said dividing network.

4. A regulating repeater for post-equalizing an incoming carrier channel and pre-equalizing an outgoing voice channel comprising a terminal network for connection to a transmission line, a regulated terminal, a carrier signal channel and a voice frequency signal channel coupled to said terminal network, said carrier frequency signal channel including, a high pass filter, a first fixed equalizer for compensating for line loss, a second variable equalizer for automatically establishing a predetermined level signal and a third equalizer for compensating for line length, a dividing network, means for coupling the third equalizer to said dividing network, a demodulation channel coupling said dividing network to said regulated terminal, said demodulation channel including a demodulator and a first low pass filter, a voice frequency channel including a second low pass filter connected between said regulated terminal and said variable equalizer, a third low pass filter coupled between said high pass filter and said dividing network.

References Cited in the file of this patent

UNITED STATES PATENTS

| | | |
|---|---|---|
| 2,300,415 | Green | Nov. 3, 1942 |
| 2,360,233 | Hussey | Oct. 10, 1944 |
| 2,613,279 | Hurault | Oct. 7, 1952 |